United States Patent [19]

Long

[11] 3,806,625

[45] Apr. 23, 1974

[54] HIGH-VOLTAGE FEEDTHROUGH ASSEMBLY

[75] Inventor: Jack B. Long, Livermore, Calif.

[73] Assignee: The United States of America as represented by the United States Atomic Energy Commission, Washington, D.C.

[22] Filed: Mar. 16, 1973

[21] Appl. No.: 342,132

[52] U.S. Cl................ 174/31 R, 174/142, 277/34.3
[51] Int. Cl. ......................................... H01b 17/26
[58] Field of Search.......... 174/8, 9 R, 10, 11 R, 18, 174/20, 22 R, 23 R, 31 R, 140 R, 140 C, 142, 152 R; 339/94 R, 94 A, 117 R, 117 P; 277/3, 12, 34, 34.3, 34.6

[56] References Cited
UNITED STATES PATENTS

| | | | |
|---|---|---|---|
| 2,050,888 | 8/1936 | Kirch | 174/11 R |
| 2,958,844 | 11/1960 | Smith et al. | 174/152 R X |
| 3,126,439 | 3/1964 | Denholm et al. | 174/31 R |
| 3,328,744 | 6/1967 | Fiske | 174/152 R UX |

FOREIGN PATENTS OR APPLICATIONS

| | | | |
|---|---|---|---|
| 1,547,264 | 10/1968 | France | 174/10 |
| 880,275 | 10/1961 | Great Britain | 174/31 R |

Primary Examiner—Laramie E. Askin
Attorney, Agent, or Firm—John A. Horan; F. A. Robertson; Clifton E. Close, Jr.

[57] ABSTRACT

A small, compact feedthrough assembly for passing current from a high-voltage cable in the atmosphere into a vacuum enclosure. The assembly includes an annular inflatable sleeve around the end of the cable for squeezing air from between the cable and a ceramic tube that is mounted and sealed in a wall of the enclosure and from between the cable and a high-voltage connector sealing the vacuum end of the tube. The sleeve has a high dielectric constant and includes internal passages to enable inflation of the sleeve with a gas having a high dielectric constant. Inflation of the sleeve eliminates all air paths between high-voltage conductors and the enclosure to thereby insulate all high-voltage metal parts of the feedthrough assembly from the enclosure. The cable and inflatable sleeve are removable from the ceramic tube to permit bakeout of the enclosure at high temperatures which would destroy the cable insulation and sleeve.

8 Claims, 1 Drawing Figure

PATENTED APR 23 1974    3,806,625
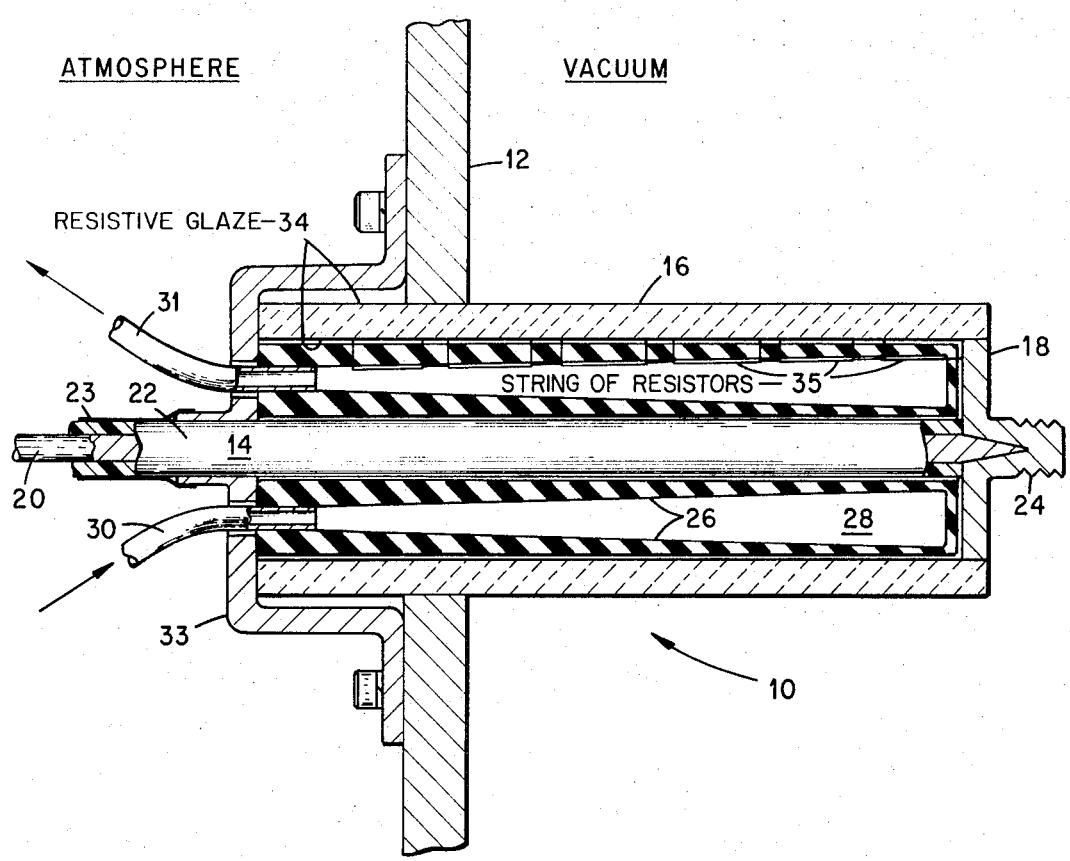

HIGH-VOLTAGE FEEDTHROUGH ASSEMBLY

ORIGIN OF THE INVENTION

The invention disclosed herein was made under, or in the course of, Contract No. W-7405-ENG-48 with the United States Atomic Energy Commission.

BACKGROUND OF THE INVENTION

The invention relates to high-voltage feedthrough assemblies, and more particularly, it relates to an inflatable dielectric sleeve as an insulator in such assemblies.

Typically, a high voltage from a cable is fed through the wall of a vacuum enclosure by means of a center conductor that is sealed in a glass or ceramic standoff insulator. However, for very high voltages, such as pulses in the 250 KV range, the air paths from the input end of the center conductor to the enclosure must be made very long in order to prevent breakdown and conduction through the air. The standoff insulators for very high voltages, therefore, must be made very large and hence require excessive space. Large insulators also constitute a hazard both electrically and physically. Other types of feedthrough assemblies may be made smaller in size by utilizing organic material having high dielectric constants. However, to attain high vacuums, vacuum enclosures usually are baked at temperatures which destroy organic dielectric materials. Thus, the portion of any assembly in which an organic dielectric material is used must be detachable from the vacuum enclosure without destroying the vacuum. But, if the assemblies are made detachable, small amounts of air become trapped between the surfaces of the assembly when it is reattached. The trapped air, even though present only in small quantities, tends to break down when subjected to very high voltages.

SUMMARY OF THE INVENTION

In brief, the invention is a feedthrough assembly for conducting high voltages from a conductor of a cable in a gaseous pressurized space, such as the atmosphere, to a connector in an evacuated space. The assembly includes an annular dielectric sleeve on one end of the cable, and a hollow insulator sealed in a wall enclosing the space. The connector is sealed in one end of the insulator, and the cable and sleeve are insertable into the insulator to bring the conductor into contact with the connector. The sleeve is made to have internal passages into which a dielectric fluid is forced to inflate the sleeve to virtually fill the spaces between the sleeve, cable, connector and insulator, thereby eliminating gaseous paths from the conductor and connector to the enclosure, which paths would otherwise break down when subjected to very high voltages fed through the assembly. A similar arrangement may also be used to exclude air paths at the ends of spliced high-voltage cables whereby an inflatable sleeve within a tube is fitted over the ends of the cables and then inflated to eliminate air paths.

It is an object of the invention to provide a small, compact high-voltage feedthrough assembly.

Another object is to eliminate gaseous high-voltage breakdown paths in a feedthrough assembly.

Another object is to use parts made of organic material in a high-voltage feedthrough assembly for a vacuum enclosure in which the parts of organic material may be removed prior to high-temperature bakeout of the enclosure.

Another object is to use an inflatable dielectric sleeve to eliminate high-voltage gaseous breakdown paths in a feedthrough assembly.

Another object is to use an inflatable dielectric sleeve to eliminate high-voltage gaseous breakdown paths in a connector for spliced high-voltage cables.

Another object is to provide a safety ground shield over all external surfaces of a feedthrough assembly and the external surfaces of a connection between high-voltage cables.

Other objects and advantageous features of the invention will be apparent in a description of a specific embodiment thereof, given by way of example only, to enable one skilled in the art to readily practice the invention, and described hereinafter with reference to the accompanying drawing.

BRIEF DESCRIPTION OF THE DRAWING

The FIGURE is a cross-sectional view of a high-voltage feedthrough assembly, according to the invention.

DESCRIPTION OF AN EMBODIMENT

Referring to the drawing, there is shown in the FIGURE a high-voltage feedthrough assembly 10 which forms a sealed atmosphere-vacuum interface in a metal wall 12 of a vacuum enclosure and provides an insulated conduction path for passing high voltages over a cable 14 into the vacuum space within the enclosure. The assembly 10 includes a hollow elongated insulator such as a ceramic insulating tube 16 that extends through the wall 12 from the atmosphere into the vacuum and is sealed in the wall 12 against vacuum leaks with a suitable metal-to-ceramic brazing material. A connector such as a metal plug 18 is similarly sealed in the vacuum end of the tube 16. High voltages are fed through the assembly over the cable 14 which includes a metallic center conductor 20 covered with organic insulation 22 and a metal shield 23. The plug 18 is provided with a contacting surface such as a central hole for receiving a stripped terminal end of the conductor 20. On the vacuum side of the plug 18, a connecting stub 24 is provided for connection of a conductor and corona rings to receive the high voltages within the vacuum. An annular sleeve 26 is positioned around the end of the cable 14, from which the shield 23 is stripped, to fill the space between the cable insulation 22 and the tube 16. The sleeve 26 is made of a gastight dielectric material that encloses an inner space 28. Inlet and outlet tubes 30 and 31 are sealed in the sleeve and connect with the space 28. A grounded shield cap 33 is provided to contain the expanding sleeve and hold the cable in a centered position, with the stripped end of the cable forced into good electrical contact with the plug 18 and stub 24, and with the sleeve 26 bottomed against the plug 18. The shield 23 is electrically connected to the cap 33, such as by brazing, so that the atmospheric side of the assembly 10 is completely enclosed with a ground shield.

To ready the assembly 10 for feeding through high-voltage pulses, a dielectric fluid, either a gas such as $SF_6$ or a liquid, is supplied to the space 28 through the pipe 30. After flushing of the space 28, the tube 31 is blocked in order that the pressure of the dielectric fluid within the sleeve 26 may be raised. It will be noted that the walls of the sleeve 26 are tapered from a thin wall at the vacuum end of the tube 16 to a thicker wall at the atmospheric end. Thus, as the gas pressure is raised within the sleeve, the portion of the sleeve 28 that is adjacent the plug 18 expands first, against the plug 18, the tube 16 and the cable, forcing the air at that end of the tube towards the other end and into the atmosphere. As the pressure in the space 28 is increased, the remaining part of the sleeve 26 expands towards the atmospheric end, squeezing the remaining air from between the cable and sleeve and from between the sleeve and tube into the atmosphere. Such action completely removes all air paths extending from the atmosphere to the plug 18 and stripped end of the conductor 20, and instead, fills the space between the cable 14 and sleeve 16 with dielectric material. Breakdown and conduction through air paths in the feedthrough assembly are thereby eliminated.

The invention is particularly useful where a feedthrough assembly for very high voltages into a high vacuum is required. In order to attain high vacuums it is necessary to first remove gases trapped in the interstices of the vacuum enclosure and the equipment mounted in the enclosure. This is done by sustained baking of the enclosure and the equipment in it at high temperatures while a vacuum is maintained within the enclosure. By simply removing the cap 33 and deflating the sleeve 26, the cable 14 and the sleeve may be removed from the assembly 10 without affecting the vacuum seal between the assembly and the wall 12. A vacuum enclosure with such an assembly thus may be baked at temperatures which would destroy the organic material of the sleeve and cable. After bakeout, the cable and sleeve may be easily replaced in the assembly 10 with air paths excluded between high-voltage part and the enclosure.

Where more than one type of dielectric material is used for holding off very high voltages, the dielectric constants of the materials used should be as close as possible in order to avoid differential field reduction effects and consequent buildup of differential static potentials across the materials. Such potentials can cause arcing through the material having a low dielectric constant and then cumulative arcing over all of the dielectric materials. In order to eliminate this effect, a very high resistance may be connected between the plug 18 and the wall 12 to drain the static charges. Such a resistance may be provided, for example, by coating atmospherically exposed surfaces 34 of the ceramic tube 16 with a glaze containing particulate resistive material. Alternatively, or in combination with a resistive glaze, a string of resistors 35 may be connected between the plug 18 and wall 12. The resistors may conveniently be embedded either partially or wholly in one of the walls of the sleeve 26, with connections extending through the ends of the sleeve into contact with the plug 18 and the cap 33 and wall 12.

A high-voltage feedthrough assembly was constructed according to the invention using a ceramic tube 8 inches long and 4 inches in diameter, an inflatable sleeve made of silicone rubber, filled with $SF_6$ gas, having an inner diameter of 1, inch and positioned over the end of a cable carrying 250 KV pulses from atmosphere into a vacuum.

An inflatable dielectric sleeve may also be used to insulate spliced high-voltage cables. The sleeve may be conveniently tapered from the ends towards a thin wall at the center of the sleeve and may be enclosed with an electrically conductive tube that is connected to the cable shields which are stripped away from the cable insulation which is covered by the sleeve, thereby providing an airless, shielded connection between the cables.

While an embodiment of the invention has been shown and described, further embodiments or combinations of those described herein will be apparent to those skilled in the art without departing from the spirit of the invention.

What I claim is:

1. A feedthrough assembly for conducting high voltages from a cable in a space pressurized with a gas to a connection in an evacuated space that is defined by an enclosure including a wall, the cable having a center conductor covered with insulation and having an end with the center conductor exposed, comprising:
   an enclosure including a wall;
   a cable having a center conductor covered with insulation and having an end with the center conductor exposed;
   a hollow elongated insulator sealed in the enclosure wall;
   an electrically conducting connector sealed in one end of said insulator;
   an inflatable dielectric sleeve having inner passages, said sleeve being positioned over the insulation at the end of the cable adjacent the exposed conductor and inserted with said cable into said insulator so that the exposed center conductor is in contact with said connector; and
   means for inflating said sleeve with a dielectric fluid forced into said inner passages to squeeze the gas from the spaces between said sleeve and said cable, said connector and said insulator;
   said inner passages in said sleeve being defined by tapered walls enclosing an elongated space, said walls being thin at the end adjacent the exposed conductor and thicker at the opposite end.

2. The assembly of claim 1, wherein said sleeve is inflated with a dielectric gas.

3. The assembly of claim 2, wherein said gas is $SF_6$.

4. The assembly of claim 1, wherein said insulator is a hollow ceramic tube and said sleeve has a cylindrical shape conforming to said tube.

5. The assembly of claim 1, further including a high resistance connected between said connector and the enclosure wall.

6. The assembly of claim 5, wherein said insulator is ceramic, and said resistance is particulate resistive material included in a glaze spread over the surfaces of said insulator that are exposed to the pressurized gas.

7. The assembly of claim 5, wherein said resistance is a string of resistors embedded in said sleeve.

8. The assembly of claim 1, wherein said cable includes a shield external to said assembly, and further including a shield cap electrically connected to said cable shield and said enclosure.

* * * * *